United States Patent [19]

Isayev

[11] Patent Number: 5,260,380
[45] Date of Patent: Nov. 9, 1993

[54] SELF-REINFORCED COMPOSITE AND PROCESS FOR PREPARING SAME

[75] Inventor: Avraam Isayev, Akron, Ohio
[73] Assignee: The University of Akron
[21] Appl. No.: 824,334
[22] Filed: Jan. 23, 1992
[51] Int. Cl.⁵ .............. C08L 23/00; C08L 67/00; C08F 20/00; C08J 5/00
[52] U.S. Cl. .................. 525/177; 524/539; 525/391; 525/397; 525/425; 525/426; 525/436; 525/437; 264/331.21; 264/DIG. 64; 264/DIG. 66
[58] Field of Search .............. 524/539; 525/444, 425, 525/436, 437, 177, 391, 397, 426; 264/331.21, DIG. 64, DIG. 66

[56] References Cited

U.S. PATENT DOCUMENTS

| | | | |
|---|---|---|---|
| 4,267,289 | 5/1981 | Froix | 525/444 |
| 4,325,903 | 4/1982 | Wissbrun et al. | |
| 4,386,174 | 5/1983 | Cogswell et al. | 525/425 |
| 4,728,698 | 3/1988 | Isayev et al. | 525/439 |
| 4,820,568 | 4/1989 | Harpell et al. | 428/113 |
| 4,835,047 | 5/1989 | Isayev et al. | 428/294 |
| 4,837,268 | 6/1989 | Matsumoto et al. | 524/539 |
| 4,902,369 | 2/1990 | Avramova et al. | |
| 4,992,514 | 2/1991 | Schultze et al. | 525/425 |
| 5,006,402 | 4/1991 | Isayev | 525/450 |
| 5,043,400 | 8/1991 | Tsuruta et al. | 525/425 |
| 5,070,157 | 12/1991 | Isayev et al. | 525/444 |

FOREIGN PATENT DOCUMENTS

WO91/01879 2/1991 PCT Int'l Appl. .

OTHER PUBLICATIONS

Tg of Polymers, Polymer Handbook, Ed. Brandrup-/Immergut, p. III-74, Interscience Publishers, N.Y. 1966.

*Primary Examiner*—Veronica P. Hoke
*Assistant Examiner*—Tae H. Yoon
*Attorney, Agent, or Firm*—Oldham, Oldham & Wilson

[57] ABSTRACT

A self-reinforced polymer composite in the form of a non-laminated shaped article is prepared by (a) melt blending (I) a matrix polymer which is a melt processable flexible chain polymer or first liquid crystal polymer (LCP) and (2) a fiber forming melt processable second LCP under high strain mixing conditions inducing fiber formation, cooling and stretching the resulting blend, and (b) shaping the resulting blend by injection molding or extrusion at a temperature which is above the minimum melt processing temperature of the matrix polymer but below that of the fiber forming second LCP. By shaping at a temperature below the minimum processing temperature of the fiber-forming LCP, the fiber structure formed during cooling is preserved. The resulting shaped articles have outstanding mechanical properties, e./g., tensile strength, modulus and impact strength.

14 Claims, No Drawings

SELF-REINFORCED COMPOSITE AND PROCESS FOR PREPARING SAME

TECHNICAL FIELD

This invention relates to self-reinforced polymer composites and processes for preparing the same, in which the composite is in the form of a shaped article and in particular an injection molded or extruded article. More particularly, this invention relates to articles and processes of this type in which the self-reinforced polymer composite comprises first and second polymers having overlapping melt processing temperature ranges and in which at least one of the polymers (the second) is a liquid crystal polymer, and in which processing is carried out under conditions that fibers of the second polymer are formed and are then preserved in the ensuing shaping operation.

BACKGROUND ART

Fiber reinforced polymer composites are well known and widely used. Polymers of improved strength and increased stiffness can be obtained by use of an appropriate reinforcing fiber. Probably the most widely used reinforcing fibers are glass, carbon and aramid.

The base polymers used in making polymer composites such as those described above include a wide range of thermoplastics, such as polystyrene and copolymers thereof, polyamides, polycarbonate, polyetheramide, polyetherketone (PEEK) and polyesters such as polybutylene terephthalate. These polymers may either be amorphous or semi-crystalline. They may be called flexible chain polymers, since individual monomer units in the polymer chain are free to rotate with respect to each other so that the polymer chain will assume a random shape. Numerous references, including by way of illustration, F. N. Cogswell, *Intern. Polymer Processing*, vol. 1, no. 4, pp 157–165 (1987) disclose such polymers.

U.S. Pat. No. 4,820,568 to Harpell et al discloses a multi-layer composite laminate comprising a plurality of prepreg layers, in which each layer comprises high strength preformed fibers of a conventional fiber reinforcing material, (e.g., carbon, graphite, cellulose or metal) in a flexible chain polymer matrix.

Self-reinforced polymer composites comprising microscopic liquid crystal (or wholly aromatic polyester) fibers formed in situ in a matrix of flexible chain thermoplastic polymer have been developed in recent years. U.S. Pat. Nos. 4,728,698 and 4,835,047 both to Isayev et al, illustrate such composites. The essentially unidirectionally oriented fibers are formed by application of high strain mixing conditions.

Also known are polymer blends of two or more melt processable wholly aromatic polyesters, each of which is capable of forming anisotropic melt phase (i.e., a liquid crystal polymer). Such blends are disclosed, for example, in U.S. Pat. Nos. 4,267,289 to Froix and 4,837,268 to Matsumoto et al. Both references disclose the formation of injection molded articles for new respective polymer blends, but neither discloses the formation of reinforcing fibers in situ, and both carry out injection molding at a temperature at which both (or all) polymers are melt processable.

U.S. Pat. No. 5,070,157 to Isayev et al, issued Dec. 3, 1991, discloses polymer blends of two wholly aromatic polyesters of liquid crystal polymers having different melting points or glass transition temperatures, so that one of these polymers is capable of forming fibers in situ in a matrix of the other, and further discloses injection molding of such blends, but at a temperature at which both or all liquid crystal polymers are melt processable.

DISCLOSURE OF THE INVENTION

This invention according to one aspect provides a shaped article formed from a polymer blend comprising first and second polymers, wherein said first and second polymers are phase separated in the solid state and at least the second polymer is molecularly oriented and wherein further (1) the first polymer is either a thermoplastic flexible chain polymer or a thermotropic liquid crystal polymer and the second polymer is a thermotropic liquid crystal polymer which is different from the first polymer, (2) the first and second polymers are melt processable and have overlapping processing temperature ranges, (3) the minimum melt processing temperature of the second polymer is higher than that of first polymer, and (4) the second polymer is capable of forming sub-microscopic fibers in situ in a matrix of the first polymer, and wherein the shaped article is formed by blending the first and second polymers under conditions inducing molecular orientation of at least the second polymer, which conditions include a temperature at which both polymers are melt processable, cooling the blend with resulting molecular orientation in the second polymer, and shaping the blend into a shaped article at a temperature at or above the minimum processing temperature of the first polymer but below the minimum processing temperature of the second polymer, whereby the molecular orientation in the second polymer is preserved.

This invention according to another aspect provides a process for forming a shaped article from a polymer blend comprising first and second polymers, wherein (1) the first polymer is either a thermoplastic flexible chain polymer or a thermotropic liquid crystal polymer and the second polymer is a thermotropic liquid crystal polymer which is different from the first polymer, (2) the first and second polymers are melt processable and have overlapping temperature ranges, (3) the minimum melt processing temperature of the second polymer is higher than that of the first polymer (4) the first and second polymers are phase separated in the solid state and (5) and the second polymer is capable of forming sub-microscopic fibers in situ in a matrix of the first polymer, which comprises:

(a) blending said first and second polymers under conditions inducing molecular orientation, said conditions including a temperature at which both polymers are melt processable, (b) stretching and cooling said blend to a temperature below the minimum melt processing temperature of the second polymer, whereby said first and second polymers are phase separated and said second polymer is molecularly orientated and (c) shaping the blend into a non-laminated shaped article at a temperature at or above the minimum processing temperature of the first polymer but below the minimum processing temperature of the second polymer, whereby the molecular orientation in said second polymer is preserved.

In a preferred embodiment, said first and second polymers are blended under fiber forming conditions in step (a), fibers of the second polymer are formed in a matrix of the first polymer upon cooling of said blend in step (b) and the fiber structure in said second polymer is preserved in step (c).

The preferred shaped article is an injection molded or extruded article.

By shaping (e.g., molding or extrusion) the polymer blend at a temperature which is below the minimum processing temperature of the second polymer (which is the polymer having the higher melt processing temperature), the molecular orientation (eg., fiber structure) in the composite or blend as initially formed by melt blending is preserved.

BEST MODE FOR CARRYING OUT THE INVENTION

This invention will now be described with particular reference to specific embodiments thereof, including the best mode and preferred embodiment.

The required starting materials for preparing shaped articles (such as extruded or injection molded articles) of this invention are either a thermoplastic matrix (or base) polymer and a liquid crystal polymer (LCP), or two liquid crystal polymers. An LCP herein is in accordance with the art-recognized definition, i.e., a polymer which is anisotropic even in the liquid phase.

The matrix polymer according to a first embodiment of this invention is a flexible chain polymer, i.e., one in which successive units of a polymer chain are free to rotate with respect to each other, so that the polymer chain can assume a random shape. The matrix polymer may be either amorphous or semicrystalline. Suitable matrix polymers for this invention include conventional thermoplastic materials (including blends thereof) such as polyethylene, polypropylene, ethylenepropylene copolymers, polystyrene and styrene copolymers, polyvinylchloride (PVC), polyamide (nylon), polyesters such as polyethylene terephthalate or polybutylene terephthalate, polycarbonate, polyether etherketone (PEEK), polyphenylene sulfide, polyphenylene oxide, polysulfone and polyetherimide and blends of polystyrene with polyphenylene oxide. The flexible chain polymer is melt processable.

Polypropylene is an especially advantageous starting material. Polypropylene is inexpensive and readily available compared to most addition polymers. However, polypropylene based polymer compositions in general have comparatively poor mechanical properties, such as low tensile strength at break and low tensile modulus. Polypropylene-based composites of the present invention, comprising polypropylene and an LCP in which sub-microscopic LCP fibers are formed in situ in a polypropylene matrix, and which has not been reheated to a temperature above the minimum processing temperature of the LCP after the fibrous composite (of LCP fibers in a polypropylene matrix) is first formed, exhibits surprisingly good mechanical properties which makes such polymer composite suitable for uses where ordinarily a stronger and more expensive polymer would be needed.

The second polymer in compositions or blends according to this first embodiment of the invention is a liquid crystal polymer (LCP). A liquid crystal polymer is a polymer which exhibits anisotropy (i.e., "crystallinity") in the liquid phase. The liquid crystal polymers used in this invention are thermotropic, i.e., they have a melting point or glass transition temperature or both and are melt processable.

Suitable liquid crystal polymers for this invention may be divided into two classes: those having a melting point and glass transition temperature and those having a glass transition temperature only. Preferred liquid crystal polymers in both classes are wholly aromatic copolyesters.

Representative thermotropic liquid crystal polymer starting materials are wholly aromatic copolyesters such as those described in U.S. Pat. Nos. 3,991,014; 4,067,852; 4,083,829; 4,130,545; 4,161,470; 4,318,842; and 4,468,364; or such as those described in U.S. Pat. Nos. 4,772,993; 4,727,129; 4,727,131; 4,728,713; 4,728,714; 4,762,907; and 4,788,272.

According to a second embodiment of the invention, the starting materials are two liquid crystal polymers having overlapping processing temperature ranges but different minimum processing temperatures.

The first polymer (either a flexible chain polymer or an LCP) and the second polymer (always an LCP) must have overlapping melt processing temperature ranges. That is, the maximum processing temperature of the first polymer is above the minimum processing temperature of the second polymer. The minimum processing temperature of the second polymer should be higher than the minimum processing temperature of the first (base or matrix) polymer. In the case of a polymer having both a melting point and a glass transition temperature (which is always below the melting point) the processing temperature range lies primarily above the melting point. However, in some cases the minimum processing temperature may be below the melting point. A plot of modulus decay, i.e., modulus vs. temperature, will show a sharp change in modulus with temperature at the minimum melt processing temperature (modulus being much higher at temperatures below the minimum processing temperature) in both classes of polymers, i.e., polymers having a melting point and polymers having a glass transition temperature but no melting point. In the case of a polymer having a glass transition temperature only (i.e., no melting point), the minimum processing temperature is above the glass transition temperature.

The first and second polymers must be phase separated in the solid state. That is, the two polymers must be essentially immiscible or incompatible in the solid state.

The second polymer, in appropriate composition ranges and under appropriate high strain mixing conditions (to be described hereinafter), forms submicroscopic fibers in situ in a matrix of the first or base polymer. Even if relative amounts of the first and second polymers are such that fibers of the second polymer do not form (i.e., at higher concentrations of the second polymer), the two polymers are phase separated in the solid state and the second polymer (always an LCP) is molecularly oriented. It is believed that formation of reinforcing fibers of the second polymer contributes to the outstanding mechanical properties of compositions or blends according to this invention.

A suitable polymer pair for forming blends or compositions according to the first embodiment of this invention is polypropylene and "Ultrax" KR-4002, which is a thermotropic rigid rod wholly aromatic copolyester sold by Badische Anilin and Sodafabrik (BASF) of Ludwigshafen, Germany. This material is believed to be a wholly aromatic co-polyester comprising p-oxybenzoyl, terephthaloyl and hydroquinone moieties, and is believed to be generally similar in composition to the materials described in the above cited U.S. Pat. Nos. 4,722,993; 4,727,129; 4,727,131; 4,728,723; 4,728,724;

4,762,907; and 4,788,272. This material will be designated herein as "LCP-2". This material has a glass transition temperature of about 120°–125° C. as shown by the peak of a curve showing tan δ as a function of temperature. (In some cases glass transition temperature can also be measured by DSC, but applicant has found tan δ to be more precise).

A suitable polymer pair for making blends according to the second embodiment of this invention is "Vectra" A 950, which is supplied by Celanese Research Company, Summit, N.J. USA, and "Ultrax" KR-4003, which is supplied by BASF.

"Vectra" A 950 is a wholly aromatic thermotropic liquid crystal polymer having a melting point of about 275° C. This polymer is believed to consist essentially of about 25–27 percent of 6-oxy-2-naphthoyl moieties and about 73–75 percent of p-oxybenzoyl moieties, as described in example 4 of U.S. Pat. No. 4,468,364 and in G. W. Calundann, et al. "Anisotropic Polymers, Their Synthesis and Properties", reprinted from Proceedings of the Robert A. Welch Conferences on Chemical Research, XXVI Synthetic Polymers, Nov. 15–17, 1982, Houston, Tex., pp. 247–291 (see especially pp. 263–265).

"Ultrax" KR-4003 has a melting point of 315° C. and is believed to be a wholly aromatic partially crystalline copolyester comprising p-oxybenzoyl, terephthaloyl and hydroquinone moieties and is believed to be generally similar in composition to the materials described in the above cited U.S. Pat. Nos. 4,772,993; 4,727,129; 4,727,131; 4,728,713; 4,728,714; 4,762,907; and 4,788,272.

The above pairs are illustrative and not limiting, but in all cases the minimum processing temperature of the second polymer must be higher than the minimum processing temperature of the first polymer. This requirement can be satisfied in a polymer pair in which both polymers have sharp melting points (the second embodiment), or in a polymer pair in which neither polymer has a well defined melting point (i.e., both polymers have glass transition temperatures but neither has a melting point, the first embodiment, for example) or in a polymer pair in which one polymer has a glass transition temperature but no melting point and the other polymer has a melting point. The amount of second polymer in a blend of this invention may range from about 2 to about 98% by weight of such second polymer, preferably from about 5 to about 95% of said second polymer, based on the combined weights of said first and second polymer. The second polymer is preferably present in a fiber-forming amount, i.e., one which will result in the formation of fibers of the second polymer (always an LCP) in situ when a blend of the first and second polymers is processed as is hereinafter described. Fiber forming amounts vary from system to system. Fiber forming amounts of the second polymer in any system which meets the other requirements (e.g., incompatibility of the first and second polymers and overlapping melt processing temperature range) can be determined experimentally by making a series of compositions of progressively increasing content of the second polymer, ranging from 0% to 100% of second polymer at desired intervals (say 10 percentage points) and then subjecting the blend to high strain rate mixing conditions as hereinafter described.

Additional polymers may be present if desired. Thus, a composition according to the first embodiment may comprise one or more additional thermoplastic chain polymers and/or one or more additional liquid crystal polymers. Such additional polymer or polymers may be either compatible or incompatible with either or both of the first two mentioned polymers. (Polymers are compatible if they are capable of forming homogenous blends in the solid state. Polymers are incompatible if they are phase separated in substantially all proportions in the solid state). The preferred blends, however, are binary blends consisting essentially of a first polymer (either a thermoplastic flexible chain polymer or an LCP) and a second polymer (always an LCP) as above described.

Additional materials, (i.e., additives) are not required but may be present. Thus, it is within the scope of the invention to prepare a mixed composite polymer by inclusion of an additional (preformed) reinforcing fiber, such as glass, carbon or aramid, in addition to the fiber forming liquid crystal polymer. The additional reinforcing fiber may be incorporated into either the base polymer (the first polymer) or the fiber forming liquid crystal polymer (the second polymer). The additional reinforcement provided by the additional fiber is not necessary in most cases, but where a very high stiffness (or very high strength) reinforced polymer composite is desired, such can be attained according to the present invention without the high loadings of conventional reinforcing fiber required in presently known polymer/fiber composites.

Other additives, such as pigments and fillers, coupling agents, flame retardants, lubricants, mold release agents, plasticizers and ultra violet stabilizers may be mixed with the base polymer and fiber forming liquid crystal polymer as desired. The use of such additives is well known in the polymer processing art.

The preferred process for making shaped composites of this invention will now be described in greater detail.

The matrix polymer (or first polymer) and the fiber forming liquid crystal polymer (or second polymer) are charged in solid form to a high strain mixing apparatus and are mixed at a temperature at which both are processable by a suitable means which will assure thorough mixing of two polymers. Any additional ingredients which are desired in the final product are also mixed in at this time. The mixing apparatus may comprise, for example, a single screw extruder followed by a static mixer, or a twin screw extruder. A particularly suitable extruder for the practice of this invention is a Killion one inch single screw extruder, sold by Killion Extruders, Inc. of Riviera Beach, Fla. Other suitable extruders (disclosed in U.S. Pat. Nos. 4,728,698 and 4,835,047) include a ZSK 30 twin screw extruder, sold by Werner & Pfleiderer Corp. of Ramsey, N.J. When a single screw extruder is used, the extruder is followed by a static mixer such as a 6-element Koch Model No. KMB-150 static mixer, made and sold by Koch Industries. In any case, the extruder (and the static mixer when used) must be provided with a heating jacket, preferably one which permits zoned heating, so that the matrix polymer and the LCP may be heated from ambient temperature to processing temperature.

The matrix polymer, fiber forming liquid crystal polymer, and any additional ingredients are fed in solid form to the mixing apparatus. The matrix polymer and the liquid crystal polymer are conveniently fed in the form of pellets. These pellets may be either a mixture of pure matrix polymer pellets and pure LCP pellets, or polymer blend pellets.

The processing temperature in the mixing apparatus is a temperature at which both polymers are melt processable. This is a temperature above the minimum melt processing temperature of each polymer.

The ingredients, initially in solid form, are brought up to processing temperature at the beginning of the mixing operation and are thereafter maintained in the desired temperature range. In the case of the preferred apparatus as described above, the ingredients are brought up to temperature near the feed end of the mixing apparatus and are thereafter maintained at appropriate processing temperature. The melt blend is then extruded from the discharge end of the mixing apparatus in any desired shape, as for example rods or sheets.

The aforedescribed melt blending step is known in the art and is described, for example, in U.S. Pat. Nos. 4,728,698; 4,835,047; and 5,070,157, all to Isayev (the inventor herein) et al. and in U.S. Pat. No. 5,032,433 to Isayev and published U.S. Pat. Nos. 4,728,698; 4,835,047 and 5,070,157 describe the fiber structure of the fiber forming liquid crystal polymer in further detail. The fiber structure may differ somewhat depending on whether the matrix polymer is a flexible chain polymer or a liquid crystal polymer, but in general the second polymer comprises submicroscopic fibers not over about 10 microns in diameter and having a high aspect (or length to diameter) ratio, e.g., over 50 and more typically over 100.

The extrudate as it cools in air is stretched to a high extension ratio such as to enhance molecular orientation and to develop fibers in preferred blend compositions. The stretching of a polymer blend containing a liquid crystal polymer is illustrated, for example, in published international "PCT" application, International Publication No. WO 91/01879, published Feb. 21, 1991, and in U.S. Pat. No. 5,032,433 to Isayev (both cited supra). As the extrudate blend cools and is stretched, submicroscopic fibers of the second polymer in a matrix of the first polymer form in blends of preferred composition. In other blends, as described herein, such as blends having a high percentage by weight of the second polymer, the two polymers are phase separated and the second polymer (and, it is believed, the first polymer also) is molecularly oriented in the extrusion or flow direction. As the blend cools, submicroscopic fibers of the second polymer in a matrix of the first polymer form such as to enhance molecular orientation and to develop fibers in preferred blend compositions.

The second principal step of this invention, i.e., injection molding, extrusion or other shaping, is carried out at a temperature above the minimum melt processing temperature of the matrix polymer but below the minimum melt processing temperature of the second polymer (or fiber forming liquid crystal polymer). In this way the molecular orientation and preferably the fiber structure of the second polymer, formed in situ as described above, is preserved. This represents a significant departure from the processing techniques of the aforesaid U.S. Pat. Nos. 4,728,698, 4,835,047 and 5,070,157, in which injection molding is carried out at a temperature at which both polymers are melt processable.

An injection molding machine of known type may be used. The molding machine used in the examples hereinafter described, i.e. a BOY 15-S Reciprocating Screw injection molding machine with a maximum shot size of 36 cm³, is used for purposes of illustration but it will be understood that other suitable injection molding machines may be used.

Other apparatus for forming a shaped article may also be used. For example, other types of molding apparatus, as for example apparatus for blow molding or compression molding, or an extrusion apparatus which has an extrusion die which gives a shaped article or part (as opposed to a thin sheet or film).

The shaped article produced by the process of this invention is a three dimensional article (as opposed to a thin film or flat sheet) in which shaping takes place without lamination at a temperature at or above the minimum processing temperature of the first polymer but below the minimum processing temperature of the second polymer. That is, shaping according to this invention does not involve preparation of laminates in which a multiplicity of layers of sheet or film are stacked together and pressed, as disclosed, for example in published in international (PCT) application, International Publication No. WO 91/01879, published Feb. 21, 1991 (cited supra). A shaped article of this invention is non-laminated.

Molded articles or parts, and more generally shaped articles or parts, produced according to the present invention have outstandingly good mechanical properties such as tensile strength and secant modulus. While excellent mechanical properties have been found previously in molded articles produced from wholly aromatic polyester fiber reinforced thermoplastics in which the wholly aromatic polyester (or LCP) fibers are formed in situ under high strain conditions followed by cooling, and in which molding was carried out under conventional conditions at which both the thermoplastic base polymer and the liquid crystal polymer are melt processable (see U.S. Pat. Nos. 4,728,698 and 4,835,047, cited supra), even better mechanical properties are obtained herein. It is believed that this is because none of the fiber structure of the LCP is lost during molding or other shaping by virtue of the fact that the molding or shaping temperature (i.e, the reheat temperature) is kept below the minimum melt processing temperature of the reinforcing LCP.

The present process also makes it possible to produce shaped articles of virtually any desired shape which can be achieved by conventional molding processes, under conditions in which the maximum reheat temperature is below the minimum processing temperature of the reinforcing liquid crystal polymer. This technique was previously available for the formation of composite laminates. The present invention thus lends considerable versatility of the production of articles having outstanding mechanical properties and formed from a self-reinforced polymer blend including microscopic reinforcing fibers of an LCP formed in situ in a matrix of another polymer (either thermoplastic flexible chain polymer or another LCP) having a minimum melt processing temperature of the reinforcing LCP.

This invention will now be described further with reference to the examples which follow.

EXAMPLE 1

This example described preparation and testing of a self-reinforced polymer composite or a blend of polypropylene (PP) and a liquid crystal polymer, which will be designated herein as LCP-2A.

Polypropylene is "Profax" 6523, supplied by Himont, Inc. LCP-2A is a wholly aromatic polyester supplied by BASF under the trade name, "Ultrax" KR-4002, and is more fully described earlier in this specification.

Blends of 25%, 50%, and 75% by weight of polypropylene and correspondingly 75%, 50% and 25% by weight of LCP-2A (i.e., 25/75, 50/50 and 75/25 blends) were prepared.

Both control blends and test blends according to this invention were prepared. Two types of blending apparatus were used, one for preparing the control blends and the other for preparing the blends according to this invention.

The blending apparatus for preparing control blends comprised, in series, (1) a Killion 1 inch single screw extruder sold by Killion Extruders Inc. of Riviera Beach, Fla., (2) a six-element Koch model KMB 150 static mixer with a ⅛ inch (in diameter) discharge die. This apparatus is similar to the apparatus described, for example, in U.S. Pat. No. 5,006,402, issued on Apr. 9, 1991.

The second blending apparatus used for preparing test samples according to this invention comprised, in series, (1) a Killion one inch single screw extruder, followed by (2) a 6-element Koch model KMB 150 static mixer as above described, (3) a coat hanger extrusion die having a heating jacket and a discharge slit 1.5mm.×150mm, and (4) a stretching device. Apparatus including the aforesaid extrusion die and stretching device is shown diagrammatically and described in U.S. Pat. No. 5,032,433, issued Jul. 16, 1991.

Control samples were prepared in the aforesaid first blending apparatus, using a screw speed o 50 rpm and an extrusion temperature of 260° C. Rods exiting the static mixer were subsequently quenched and chopped by means of a pelletizer. The dry pellets were fed into the hopper of a BOY 15-S injection molding machine. The barrel temperature of the molding machine was maintained at 260° C., which is above minimum processing temperature of both the polypropylene and LCP-2A A constant volumetric flow $4.64 \times 10^{-5}$ m$^3$/sec was maintained at an injection pressure 13.8 MPa. The mold temperature was 120° C.

Test samples were prepared in the second apparatus described above. Solid pellets of polypropylene and LCP-2A were fed to the above described mixing apparatus. A blend temperature of 260° C. and a screw speed of 50 RPM were maintained. Sheets of polymer blend were discharged through the die slit at a speed of 12.3 in./min. The extruded sheet was further drawn at a speed of 341 in./min. (representing a stretch or draw ratio of 27.7). The sheet gradually cooled to ambient as it was being drawn.

These sheets were then fed to the hopper of the BOY 15-S injection molding machine. The barrel temperature of the molding machine was maintained at 220° C., which is above the minimum processing temperature of polypropylene but below that of LCP-2A. This injection molding machine was a BOY 15-S reciprocating screw injection molding machine with a maximum shop size of 36 cm$^3$ and a clamping force of 24 tons. A constant volumetric flow of $4.64 \times 10^{-5}$ m$^3$/sec was maintained at an injection pressure of 13.8 MPa for all blends in the molding machine. The mold temperature was 120° C. The molded parts in both cases were end-gated dumbbell shaped bars of two sizes, i.e., 0.155×0.0125×0.0033 m (standard tensile bars, STB) and 0.0635×0.031×0.0015 m (mini tensile bars, MTB). Standard and mini tensile bars of both test and control samples were prepared. Mechanical properties, i.e., tensile strength (strength at break), elongation at break and tensile modulus (or secant modulus) of MTB's were measured using a MTS machine (Model 305.03) at tensile speed 5 mm/min. Notched Izod impact strength of STB's was measured by means of Impact Tester (TMI). Results are shown in Table I.

TABLE I

| | Control Samples | | | Present Invention | | |
|---|---|---|---|---|---|---|
| Blend | 25/75 | 50/50 | 75/25 | 25/75 | 50/50 | 75/25 |
| Tensile Strength MPa | 62.5 | 43 | 36 | 80 | 56 | 44 |
| Modulus, GPa | 3.6 | 2.4 | 1.6 | 5.7 | 4.0 | 2.7 |
| Elongation, % | 1.9 | 1.8 | 2.8 | 1.6 | 1.3 | 1.3 |
| Impact Strength, ft. lb/inch | 2.3 | 1.4 | 1.1 | 3.0 | 1.8 | 1.3 |

In Table I above, impact tests were carried out according to ASTM method D 235C using dumbbell shaped samples, 6.3cm in length and having notches 0.25 inch (about 0.32 cm) in width, and using a 10 lb. pendulum.

Also in Table I the percentage by weight of polypropylene in each blend is given first.

EXAMPLE 2

This example describes preparation and testing of polymer blends of two liquid crystal polymers having different melting points.

The first liquid crystal polymer, herein designated as LCP-1B, was "Vectra" A-950, described earlier in this specification. This polymer has a melting point of 275° C. The second liquid crystal polymer, herein designated LCP-2B, was "Ultrax" KR-4003, also described earlier in this specification. This polymer has a melting point of 315° C.

The apparatus (both the mixing apparatus and the injection molding machine) was as described in Example 1.

The mixing or blending temperature in this example was 300° C. and the screw speed was 15 RPM. Sheets of polymer blend were discharged through the die slit at a speed of 3.7 in./min. The extruded sheet was further drawn at a speed of 514 in./min. and cooled to ambient temperature. These sheets were then fed to the hopper of the injection molding machine. The polymer blend temperature in the injection molding machine was 280° C. Otherwise, procedures and conditions were as described in Example 1.

Injection molded parts were tested for mechanical properties, i.e., tensile strength, modulus, elongation at break, and impact strength. Test apparatus and methods were as described in Example I.

Results as shown in Table II.

TABLE II

| | Present Invention | | |
|---|---|---|---|
| Blend | 25/75 | 50/50 | 75/25 |
| Tensile Strength, MPa | 188 | 176 | 146 |
| Modulus, GPa | 10.5 | 9.3 | 9.7 |
| Elongation, % | 5.1 | 4.8 | 5.8 |
| Impact strength, ft. lb/inch | 20.6 | 18.0 | 3.7 |

In Table II, the percentage by weight of LCP-2B is given first, followed by the percentage by weight of LCP-1B.

EXAMPLE 3

This example describes preparation and testing of self-reinforced polymer composite of a blend of polystyrenepoly(phenylene oxide) alloy (PS-PPO) and wholly aromatic polyester ("Vectra A95038 ) LCP. The polystyrenepoly(pheneylene oxide) used was supplied by General Electric Company, Schenectady, N.Y., under the designation "Noryl 731".

Two types of blending apparatus are used. The first blending apparatus comprised a co-rotating twin screw extruder (Werner and Pfleiderer, Ramsey, New York, Model ZSK-30) rotating at 140 RPM and having a discharge die 1/16 inch in diameter. All zones of the twin screw extruder were operated at the same temperature, 275° C., (at the melting point of LCP and much above the glass transition temperature of PS-PPO alloy). Temperature of the transition section between the extruder and the die was maintained also at 275° C. As a blend exited the die, it was cooled in a room temperature water bath located just after the exit region. The solidified extruder was cut into pellets approximately 4 mm in length with a pelletizer. These pellets were then fed to a BOY 15-S reciprocating screw injection molding machine with a maximum shot size of 36 cm$^3$. The barrel temperature was maintained at a temperature of 275° C. (which is a processing temperature of both components). Constant volumetric flow $4.64 \times 10^{-5}$ m$^3$/sec. was maintained at injection pressure of 13.8 MPa. Mold temperature was 120° C. The prepared MTB's and STB's were subjected to tensile tests and impact tests, respectively as described in Example I. In the first case samples obtained are called control samples.

The other apparatuses (both the mixing apparatus and the injection molding machine) were described in Example I. The mixing or blending temperature in this example was 275° C. and a screw speed of 50 RPM. Sheets of polymer blend were discharged through the die slit at a speed of 12.3 in./min. The extruded sheet was further drawn at a speed of 852.0 in./min. and cooled to ambient temperature. These sheets were then fed to the hopper of the injection molding machine. The barrel temperature in the injection molding machine was 240° C. Otherwise, procedures and conditions were as described in Example I. Injection molded parts were tested for mechanical properties as described in Example I.

Results are shown in Table III.

TABLE III

|  | Control Samples | | | Present Invention | | |
| --- | --- | --- | --- | --- | --- | --- |
| Blend | 25/75 | 50/50 | 75/25 | 25/75 | 50/50 | 75/25 |
| Tensile Strength, MPa | 176 | 103 | 86 | 196 | 155 | 97 |
| Modulus, GPa | 11.4 | 8.0 | 7.6 | 11.7 | 9.4 | 8.0 |
| Elongation, % | 2.1 | 3.1 | 3.7 | 1.9 | 2.7 | 3.5 |
| Impact strength, ft. lb/inch | 11.2 | 6.1 | 1.2 | 18.3 | 7.9 | 1.3 |

In Table III, the percentage by weight of PS-PPO alloy in each blend is given first.

While this invention has been described with reference to preferred embodiments thereof, it shall be understood that such description is by way of illustration and not limitation.

What is claimed is:

1. A non-laminated shaped article formed from a polymer blend comprising first and second polymers, wherein said first and second polymers are phase separated in the solid state and at least the second polymer is molecularly oriented and wherein further (1) said first polymer is a thermoplastic flexible chain polymer or a thermotropic liquid crystal polymer and said second polymer is a thermotropic liquid crystal polymer which is different from said first polymer, (2) said first and second polymers are melt processable and having overlapping melt processing temperature ranges, (3) the minimum melt processing temperature of the second polymer is higher than that of the first polymer, and (4) said second polymer is capable of forming submicroscopic fibers in situ in a matrix of said first polymer, and wherein said shaped article is formed by:
   (a) blending said first and second polymers under conditions inducing orientation of at least the second polymer, said conditions including a temperature at which both polymers are melt processable;
   (b) stretching and cooling said blend with resultant molecular orientation of the second polymer; and
   (c) shaping said blend into a non-laminated shaped article at a blend temperature at which said first polymer is melt processable and said second polymer is not melt processable.

2. A shaped article according to claim 1 wherein said shaped article is formed by blending said first and second polymers under fiber forming conditions and said second polymer is present in a form which includes a microscopic fibers in a matrix of said first polymer.

3. A shaped article according to claim 1 wherein said shaped article is an injection molded article.

4. A shaped article according to claim 1 wherein said article is an extruded article.

5. A shaped article according to claim 1, wherein said shaped article is a three-dimensional article.

6. A shaped article according to claim 1, wherein said first polymer is polypropylene.

7. A process for forming a non-laminated shaped article from a polymer blend comprising first and second polymers, wherein (1) said first polymer is a thermoplastic flexible chain polymer or a thermotropic liquid crystal polymer and said second polymer is a thermotropic liquid crystal polymer which is different from said first polymer, (2) said first and second polymers are melt processable and have overlapping melt processing temperature ranges, (3) the minimum melt processing temperature of the second polymer is higher than that of the first polymer, (4) said first and second polymers are phase separated in the solid state and (5) said second polymer is capable of forming submicroscopic fibers in situ in a matrix of said first polymer, and which comprises:
   (a) blending said first and second polymers under conditions inducing molecular orientation, said conditions including a temperature at which both polymers are melt processable;
   (b) stretching and cooling said blend to a temperature below the minimum melt processing temperature of the second polymer, whereby said first and second polymers are phase separated and said second polymer is molecularly oriented; and
   (c) shaping said blend into a non-laminated shaped article at a blend temperature at which said first polymer is melt processable and said second polymer is not melt processable.

8. A process according to claim 7 wherein said first and second polymers are blended under fiber forming conditions in step (a), fibers of the second polymer are formed in a matrix of the first polymer upon cooling of said blend in step (b), and the fiber structure in said second polymer is preserved in step (c).

9. A process according to claim 7 wherein said shaped article is a three-dimensional article.

10. A process according to claim 7 wherein said shaped article is an injection molded article and wherein said shaping comprises injection molding said blend into an article of desired shape at a blend temperature at or above the minimum processing temperature of said first polymer but below the minimum processing temperature of said second polymer.

11. A process according to claim 11 in which said shaped article is an extruded article and in which such shaping comprises extruding said blend through an extrusion die at or above the minimum processing temperature of said second polymer.

12. A process according to claim 7, wherein said first polymer is polypropylene.

13. A process for forming a shaped non-laminated article from a polymer blend comprising first and second polymers, wherein (1) said first polymer is a thermoplastic flexible chain polymer or a thermotropic liquid crystal polymer and said second polymer is a thermotropic liquid crystal polymer which is different from said first polymer, (2) said first and second polymers are melt processable and have overlapping melt processing temperature ranges, (3) the minimum melt processing temperature of the second polymer is higher than that of the first polymer, (4) said first and second polymers are phase separated in the solid state and (5) said second polymer is capable of forming submicroscopic fibers in situ in a matrix of said first polymer, which comprises:

(a) blending said first and second polymers under fiber forming conditions including a temperature at which both polymers are melt processable in a high strain mixing zone:

(b) discharging said blend from said mixing zone and stretching and cooling said blend to a temperature below the minimum melt processing temperature of the second polymer, whereby fibers of said second polymer are formed in a matrix of said first polymer, and (c) shaping the resulting blend into a non-laminated shaped article at a blend temperature at which said first polymer is melt processable and said second polymer is not melt processable.

14. A shaped article prepared according to the process of claim 13.

* * * * *